April 23, 1963 A. RAPPOLD 3,087,012
MEANS FOR EFFECTING AUTOMATIC CONTRAST
CONTROL IN TELEVISION RECEIVERS
Filed March 31, 1960

INVENTOR
A. RAPPOLD
BY C. H. Suydam
AGENT

United States Patent Office 3,087,012

Patented Apr. 23, 1963

3,087,012

MEANS FOR EFFECTING AUTOMATIC CONTRAST CONTROL IN TELEVISION RECEIVERS

Armin Rappold, Neuenburg, Germany, assignor to International Standard Electric Corporation, New York, N.Y., a corporation of Delaware Filed Mar. 31, 1960, Ser. No. 19,071
Claims priority, application Germany Apr. 7, 1959
6 Claims. (Cl. 178—7.3)

Figure 1:
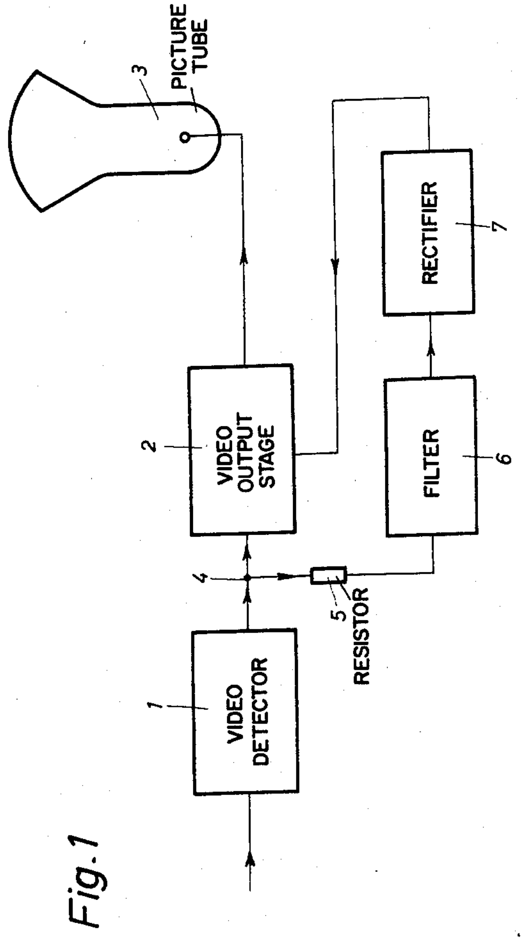

In television receivers the picture is adjusted to the desired contrast with the aid of the contrast or gain control. In conventional arrangements, this adjustment can also be done automatically in that, for example, a desired basic contrast is chosen by hand, and in that this basic contrast value is kept constant during any variations of the input signals, by the action of a control circuit.

In addition thereto, in other conventional methods, the contrast can be automatically adapted to the respective brightness of the room, for example, with the aid of a photoelectric cell.

Even if these conventional types of control methods are used, and even if simultaneously a black-level control is used in the receiver, or there has been a faultless transmission of the D.-C. components, it is often necessary to change the contrast adjustment by hand in the case of extreme changes of scenes in the course of a telecast. This necessity also remains even if care has been taken, by way of circuit-technical arrangements, that the black points in the picture always remain black, and the white points, as far as they exist, always continue to have the same brightness in all scenes.

A typical example is the picture of a landscape, substantially consisting of sky and earth, where the picture in its upper half appears to be almost white in a high degree, and relatively dark in its lower half. The white half is so bright that it has an unpleasant effect on the eye, while in the lower portion the half-tones, if existing at all, mostly remain unnoticed, because the eye is adapted to the white or bright upper surface portion of the picture. Moreover, in this case a very slight adjustment of the basic brightness may result in the disappearance of one or more half-tones in the neighbourhood of "black." As a result, such a picture tends to be monotonous, because too little information is contained in the white as well as in the black portion and the viewer is inclined to reduce the contrast.

If such a scene is followed by a picture which contains no large surfaces with black-and-white contrasts but is gray on the average, then under certain circumstances, black and white do not appear with their possible peak values. If the picture contains a great many small details, such as the facade of a Gothic church, then the contrast as chosen for the previous scene will result in a flat picture of a very poor quality and without contrast. Especially in the case of film broadcasts it is noticeable that the once chosen contrast appears to be completely wrong in some of the scenes.

In order to dispense with a manual re-adjustment, and yet ensure a contrast which is the optimum that can be adapted to the respective scene, the already mentioned method of dependently controlling the contrast has been provided.

The judging of the picture information for the purpose of effecting the control which depends thereon is done in accordance with the share of the components of the picture or frame frequency (vertical scanning frequency) and of the basic line frequency (horizontal scanning frequency) as contained in the picture spectrum. In the case of large-surface details the amplitudes of these basic frequencies are high, but in the case of picture information with many small details they only hold a small share. It has been proved that for an adequate and subjectively favorable contrast control it is sufficient to filter-out the frequencies (German standard) of 50 c./s. and 15,625 c./s. The alternating voltages with these two frequencies are rectified, and the thus obtained direct voltage is used to control the contrast in a regulating tube.

Figure 2B:
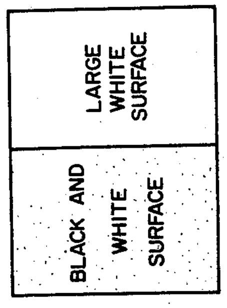
Figure 2A:
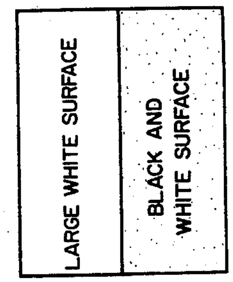

This invention will be fully understood from the following description of a specific embodiment shown in the accompanying drawings, in which:

FIG. 1 depicts in a schematic form and by a block diagram an example of an embodiment of the invention, FIGS. 2*a* and 2*b* serve to explain the operation of the invention.

Referring to FIG. 1, there are only shown those parts of a television receiver which are necessary to enable a better understanding of the invention. Thus, for example, reference 1 indicates the video-detector stage, followed by the video-output stage 2 and the picture tube 3. At point 4, between the video-detector stage 1 and the video-output stage 2, there is connected a resistor 5 and the filter arrangement 6 by which the basic components of the line and picture scan frequency corresponding to the picture signal, for example, the German standard of 50 c./s. and 15,625 c./s., are filtered from the picture signal spectrum. The filtered frequencies are then rectified in the rectifier arrangement 7. With the aid of the thus obtained D.-C. voltage, serving as the control voltage, the contrast in the video-output stage 2 is automatically adjusted in a way that the contrast is reduced when the picture contains large white or black-and-white surfaces, and is increased as soon as many small details appear in the picture (or image).

FIG. 2*a* is an illustration of a scene containing a large white surface, and a horizontal distribution of black and white which, for example, requires the filtering of the vertical scanning frequency component for the object of the invention to become effective. FIG. 2*b* shows a corresponding vertical distribution of large black-and-white surfaces, which preferably requires the filtering of the horizontal scanning frequency component. In both cases the contrast is supposed to be reduced.

The described embodiment is only to be regarded as illustrative, and not as a limitation to the scope of the invention. Thus, for example, the described arrangements will also be effective when applied in a corresponding manner to a television transmitter.

As a further embodiment of the invention it may be desirable to include also the second and third harmonics of the scanning frequencies in the control (or regulation) process. Likewise, in the case of color television pictures, it is possible to separately treat the individual color components as desired, and to control them correspondingly, in order to obtain in this way an improvement of the subjective picture impression.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A system for automatically controlling the contrast of the picture component of television signals comprising a source of television signals, means coupled to said source responsive to the frequency of the scanning frequency components of the picture component of said television signals to produce a control signal, and means coupled to the output of said source and said responsive means responsive to said control signal to control the contrast of said picture component.

2. A system for automatically controlling the contrast of the picture component of television signals comprising a source of television signals, means coupled to said source for extracting the scanning frequency components from the picture component of said television signals, means coupled to said extracting means to produce a control signal from said components, and means coupled to the output of said source and said producing means responsive to said control signal to control the contrast of said picture component.

3. A system for automatically controlling the contrast of the picture component of television signals comprising a source of television signals, means coupled to said source to filter from the picture component of said television signals the scanning frequency components contained therein, means coupled to said filter means to produce a control signal from said components, and means coupled to the output of said source and said producing means responsive to said control signal to control the contrast of said picture component.

4. A system for automatically controlling the contrast of the picture component of television signals comprising a source of television signals, means coupled to said source to filter from the picture component of said television signals the scanning frequency components contained therein, means coupled to said filter means for rectifying said components to produce a control signal, and means coupled to the output of said source and said rectifying means responsive to said control signal to control the contrast of said picture component.

5. A system for automatically controlling the contrast of the picture component of television signals comprising a source of television signals, means coupled to said source to filter from the picture component of said television signals the scanning frequency components contained therein, means coupled to said filter means for rectifying said components to produce a control signal, and amplifying means coupled to the output of said source and said rectifying means responsive to said control signal for gain control thereof to control the contrast of said picture component.

6. A television receiver comprising a video detector for reproducing transmitted television signals, a video amplifier coupled to said video detector, means coupled to said video detector for filtering from the picture component of said television signals the scanning frequency components thereof, means for rectifying said components to produce a control signal, and means for applying said control signal to said video amplifier to adjust the gain thereof to control the contrast of said picture component.

References Cited in the file of this patent

UNITED STATES PATENTS

| | | |
|---|---|---|
| 2,243,599 | Herbst | May 29, 1941 |
| 2,259,520 | Freeman | Oct. 21, 1941 |
| 2,264,172 | Batchelor | Nov. 25, 1941 |
| 2,310,671 | Batchelor | Feb. 9, 1943 |
| 2,463,735 | Bedford | Mar. 8, 1949 |
| 2,703,341 | Clark | Mar. 1, 1955 |